United States Patent [19]

Kulikowski et al.

[11] Patent Number: 5,369,244
[45] Date of Patent: Nov. 29, 1994

[54] FLUX CORED ARC WELDING ELECTRODE

[75] Inventors: Karl J. Kulikowski, Cleveland Hts.; Robert P. Munz, Jefferson, both of Ohio

[73] Assignee: The Lincoln Electric Company, Cleveland, Ohio

[21] Appl. No.: 969,122

[22] Filed: Oct. 30, 1992

Related U.S. Application Data

[60] Continuation-in-part of Ser. No. 806,777, Dec. 12, 1991, Pat. No. 5,225,661, which is a continuation of Ser. No. 608,300, Nov. 2, 1990, abandoned, which is a division of Ser. No. 405,727, Sep. 11, 1989, Pat. No. 5,003,155, and a continuation-in-part of Ser. No. 501,167, Mar. 29, 1990, Pat. No. 5,118,919, which is a continuation-in-part of Ser. No. 495,696, Mar. 19, 1990, Pat. No. 5,055,655, which is a continuation-in-part of Ser. No. 405,727, Sep. 11, 1989, Pat. No. 5,003,155.

[51] Int. Cl.$^5$ ............................................. B23K 35/22
[52] U.S. Cl. ............................ 219/145.22; 219/146.22
[58] Field of Search ................ 219/145.22, 146.22, 219/146.24, 146.3, 146.52

[56] References Cited

U.S. PATENT DOCUMENTS

| | | | |
|---|---|---|---|
| 3,318,729 | 5/1967 | Siegle et al. | 117/202 |
| 3,999,036 | 12/1976 | Muratov et al. | 219/145 |
| 4,071,734 | 1/1978 | Zarechensky et al. | 219/146.31 |
| 5,003,155 | 3/1991 | Chai | 219/145 |
| 5,118,919 | 6/1992 | Chai | 219/137 |

FOREIGN PATENT DOCUMENTS

| | | |
|---|---|---|
| 0447666 | 12/1990 | European Pat. Off. |
| 1190597 | 4/1965 | Germany. |
| 617216 | 2/1977 | U.S.S.R. |
| 1639922 | 4/1989 | U.S.S.R. |

OTHER PUBLICATIONS

A fluoroplastic material in flux-cored strip to reduce the hydrogen content of deposited metal *Automatic Welding*, vol. Jan. '85 Materials Handbook, Eleventh Edition pp. 312-315.

*Primary Examiner*—Clifford C. Shaw
*Attorney, Agent, or Firm*—Vickers Daniels & Young

[57] ABSTRACT

A flux cored arc welding electrode of the type used with external shielding gas wherein the electrode comprises an outer ferrous sheath and a particulate fill material comprising an acidic flux system and alloying agents with the fill material including an arc stabilizer, titanium dioxide, calcium fluoride, an alloying system of 0–4.0 percent by weight of electrode selected from the class consisting of aluminum, silicon, titanium, carbon and manganese. Iron powder controls the percentage of the fill of the electrode and 0.2–1.0 percent by weight of electrode is polytetrafluoroethylene powder.

43 Claims, No Drawings

FLUX CORED ARC WELDING ELECTRODE

BACKGROUND OF INVENTION

This application is a continuation-in-part application of prior application Ser. No. 806,777, filed Dec. 12, 1991 now U.S. Pat. No. 5,225,661 which is a continuation of application Ser. No. 608,300, filed Nov. 2, 1990, now abandoned, which is a division of application Ser. No. 405,727, filed Sep. 11, 1989, now U.S. Pat. No. 5,003,155 and a continuation-in-part application of prior application Ser. No. 501,167, filed Mar. 29, 1990, issued as U.S. Pat. No. 5,118,919, which is a continuation-in-part of prior application Ser. No. 495,696, filed Mar. 19, 1990 now U.S. Pat. No. 5,055,655 which is, in turn, a continuation-in-part application of prior application Ser. No. 405,727, filed Sep. 11, 1989, now U.S. Pat. No. 5,003,155.

INCORPORATION BY REFERENCE

Prior related U.S. Pat. Nos. 5,118,919 and 5,003,155 are incorporated by reference herein so that the disclosed matter of these existing documents need not be herein repeated, except to the extent to explain the present invention.

The present invention relates to the art of arc welding and more particularly of a flux cored arc welding electrode that is particularly adapted for welding steels susceptible to cracking.

This invention relates to welding under the AWS 5.20-79 specification which defines E70T-1 and E70T-5 electrodes. These two electrodes have essentially the same specified mechanical properties which are 60K psi minimum yield strength, 72K psi minimum tensile strength and 22% minimum elongation. The difference between a T1 electrode and a T5 electrode is in the resistance to cracking and in the slag system employed. Also, a T1 electrode has a specified minimum Charpy V notch (CVN) impact value of 20 ft-lb at 0° F. The T5 electrode has a specified CVN of 20 ft-lb at −20° F. Consequently, the specification for the T5 electrode is substantially more rigid in the area of crack resistance. In the past, the flux composition within the core of the electrode is different in a T1 electrode, than in a T5 electrode. The T1 electrode included an acid flux, which has good weldability, high deposition rate, and low fume emission rate. However, to obtain the crack resistance of the T5 specification, the T5 electrode included a basic flux. This T5 type electrode was employed only for harder to weld steel plates which were susceptible to cracking and had to be extremely low in cracking tendency. Consequently, in the field, there are two types of gas shielded flux cored electrodes useful for AWS A5.20-79 applications. The T1 electrodes generally exceed the minimum strength requirements, but had a higher propensity for the resulting weld metal to crack. Thus, the T5 electrode was employed extensively for difficult welding applications requiring high strength and low cracking tendencies.

When an application requires the AWS A5.2.0-79 specification, the welder must select between a T1 and a T5 type of gas shielded, multiple pass electrode. Since the T1 electrode produces better welding characteristics, higher deposition rates and lower fume rates, it has been preferred. However, certain applications must forego the advantages of an acid flux type of electrode of the T1 type and use the basic flux type electrode T5.

THE INVENTION

The present invention relates to an electrode which is formulated to normal T1 standards, which is modified to produce the T5 crack resistance. Consequently, the present invention relates to a flux cored arc welding electrode having good weldability, high deposition rate and low fume generation, while still having the crack resistance heretofore obtained with a A5.20-79 specification by only a T5 type electrode. The present invention which is formulated with an acid flux has been tested on a GBOP (Gapped bead on plate) test plate and produces crack resistance heretofore obtainable only by a T5 type electrode.

In accordance with the present invention there is provided a flux cored arc welding electrode of the T1 type which is used with an external shielding gas. This electrode comprises an outer ferrous sheath and a particulate fill material including an acidic flux system and alloying agents. The fill material includes an arc stabilizer, a titanium dioxide flux system, an alloying system of 0–4.0% by weight of electrode selected from the class consisting of aluminum, silicon, titanium, manganese and iron to control the percentage of fill, and 0.2–1.0% by weight of electrode of polytetrafluoroethylene (Teflon) powder.

It has been found that an electrode constructed in accordance with the above-defined parameters produces a low crack resistant T1 type electrode for use in a welding application requiring the AWS A5.20-79 specification.

In accordance with a more detailed aspect of the present invention, the arc stabilizer employed in the invention is sodium oxide and/or potassium oxide proportioned in accordance with the size of the electrode. In the preferred embodiment the electrode is designed for flat and horizontal welding and has a dimension of 3/32 inches. In this instance, the sodium oxide is employed. Only a minor amount of potassium oxide is contained in the electrode. This electrode can also be formulated for all-position welding using a combination of sodium and potassium oxide for arc stability, a slag system that freezes more quickly, and producing the electrode in smaller diameters such as 0. 045 to 1/16". However, smaller and larger diameter electrodes may be suited for all-position welding, depending on the particular electrode composition.

In an example of the invention where the field has a minimum percentage of 23% and a maximum percentage of 26%, the following example has been tested. The sodium oxide arc stabilizer had a minimum to maximum percentage of 0.26 to 0.29% by weight of the total electrode. The titanium dioxide forms the basic fluxing system and, in the preferred embodiment, is included in the minimum to maximum percentage of 4.06 to 4.59% by weight of the total electrode. A small amount of calcium fluoride is included in the tested specimen. The calcium fluoride is in a minimum of 0.10% and a maximum of 0.2% by weight of the total electrode in the tested embodiment of the invention. In this embodiment of the invention, the alloying agents are aluminum, silicon and manganese. The aluminum is incorporated to a maximum of 0.57% by weight of the electrode. The silicon is 0.61 to 0.69% by weight of the electrode. The primary constituent of the alloying system is manganese which exceeds 10% of the fill and is, in the preferred example, 2.51 to 2.84% by weight of the electrode. Iron powder is included in the core of the material to control the percentage of the fill to be substantially over 20% of the total electrode. In the preferred example, the iron is 54.46% of the fill which produces 12.53 or 14.61% by weight of electrode of the iron powder in the core material according to the fill being 23% or 26%. This produces a high fill percentage in the range of 23 to 26% by weight of the total electrode. In the preferred example, the Teflon, or polytetrafluoroethylene, is approximately 1.0% of the fill material. This produces 0.23 to 0.26% by weight of the total electrode being polytetrafluoroethylene. In the preferred example, aluminum oxide is incorporated in the range of 0.42 to 0.48% by weight of the electrode. Also, silicon dioxide is incorporated in the range of 1.14 to 1.29% by weight of the electrode. These percentages of constituents are used in the preferred example of the present invention which has a diameter of 3/32 inches and has been tested by a GBOP standard test and found to have crack resistance normally associated with a T5 type electrode used in AWS A5.20-79 applications.

In accordance with the present invention, as set forth in the preferred example above, a T1 type electrode with a titanium dioxide fluxing system has been found to produce crack characteristics normally associated with a T5 type electrode. This is a substantial improvement in flux cored arc welding electrodes for high strength steel.

The primary object of the present invention is the provision of a T1 type electrode having crack resistance normally associated with a T5 type electrode.

Another object of the present invention is the provision of Teflon, or polytetrafluoroethylene, powder in the core of a flux cored electrode used with external gas shielding to produce a low oxygen and low hydrogen content in the resulting weld bead.

Still a further object of the present invention is the provision of an improved flux cored arc welding electrode having high crack resistance with the weldability, deposition rate and low fume generating characteristics normally associated with electrodes having a higher propensity for cracking.

All of these objects and others are realized by producing an electrode, as defined in the example described above, which electrode is the preferred example of the present invention.

PREFERRED EMBODIMENTS

The preferred example of the present invention describes a specific electrode manufactured and tested to create a T1 type electrode having crack resistance normally associated with a basic flux type cored electrode, known as a T5 electrode. The preferred embodiments of the invention is hereinafter set forth with particular percentages associated with the invention and the properties of the various constituents used in the preferred embodiments and in the example which has been tested for the purpose of establishing that the present invention has the notch resistance of a T5 type electrode while using the formulation of a T1 electrode. In this manner, the high deposition rate can be accomplished while still obtaining the low cracking tendency for the resulting weld bead. The new electrodes substantially reduce the hydrogen content and increases the crack resistance of the resulting weld bead.

An example of the invention tested and discussed above included a 3/32 inch diameter electrode for downhand welding when the fill material had a minimum of 23% and a maximum of 26% of the total electrode. The constituents by weight of 30 fill material are listed below:

|  | PERCENT OF FILL |
| --- | --- |
| Sodium oxide | 1.13 |
| Aluminum oxide | 1.84 |
| Silicon dioxide | 4.97 |
| Potassium oxide | 0.05 |
| Titanium dioxide | 17.66 |
| Boron oxide | 0.15 |
| Calcium fluoride | 0.45 |
| Teflon | 1.00 |
| Aluminum | 1.18 |
| Silicon | 2.66 |
| Manganese | 10.93 |
| Iron Powder | 54.46 |

The above listed constituents for the fill material of the flux cored electrode was accompanied by certain trace elements and minor constituents such as zirconium oxide and carbon. Carbon was in the amount of 0.05. This electrode was subjected to GBOP test and found to have the crack resistance of a T5 type flux cored electrode, while using an acid type flux with characteristics of weldability of the T1 type electrode.

In the example of the present invention, sodium oxide is employed as 1.13% of the fill material which produces 0.26% of the electrode when the fill is 23% and 0.29% of the electrode when the fill is 26% of the electrode. The sodium oxide is an arc stabilizer which is employed for controlling the arc through the various feed speeds. It is also employed as a slag modifier to reduce the overall melting point of the slag. The stabilizer can be used in the amount of 0.2-0.5% by weight of the electrode and a portion of the stabilizer can be potassium oxide, especially when smaller diameter electrodes are employed. Thus, the arc stabilizer is a blend of sodium oxide and potassium oxide with sodium oxide being used in large diameters, such as the specific example tested, and more potassium oxide being used with smaller diameter electrodes. Indeed, in the example tested, potassium oxide was employed in a percentage of 0.05% of the fill material.

In the present invention, the aluminum oxide is employed with a slag modifier to provide better weldability, a shiny bead and overall better appearance for the resulting weld bead. Since this material is used for bead shape stackability and appearance of the bead, it could be eliminated; however, it is preferred that aluminum oxide be employed in the range of 0–0.6% by weight of the electrode. This percentage produces good slag characteristics and bead appearance of the resulting weld metal.

As another slag modifier, the invention employs silicon dioxide in the general range of 1.0-1.5% by weight of the electrode. Silicon dioxide produces a smoother bead and adjusts the overall viscosity of the slag to obtain better welding characteristics. The electrode provides a silicon/carbon/manganese alloying system; consequently, the silicon dioxide level in the fill material has an effect on the overall manganese and silicon recovery in the weld metal. Silicon dioxide is not employed as an alloying constituent; however, it does control the overall alloying of the resulting weld bead. Since the example tested is for downhand welding, it has been found that out of position welding is facilitated by reducing the silicon dioxide and including a greater amount of titanium dioxide. Consequently, for out of position use of the present invention, the silicon dioxide is reduced to less than 1.0% by weight of the electrode.

The electrode of the present invention is an acid flux type cored electrode wherein titanium dioxide is the basic fluxing agent of the electrode. It is within the skill of the art to select the preferred amount of titanium dioxide; however, in an E70T-1 type electrode for downhand welding, the titanium dioxide is provided in the range of 3.0–6.0% by weight of the electrode. Preferably, this percentage is 4.0–5.0% by weight of the electrode. In an E71T-1 type electrode, which is used for out of position welding, the amount of titanium dioxide can be doubled or increased even more. In that instance, the titanium dioxide for out of position welding in an E71T-1 type electrode could amount to from 5.0 to 12.0% by weight of the electrode.

In the preferred embodiment, the fill material is 15-20% titanium dioxide and preferably 16.5–18% titanium dioxide. In all instances, the titanium dioxide is the major component of the flux and makes an acid type flux system, with the desired weldability, deposition rate, etc. of a T1 type electrode.

In the tested electrode, the iron powder was included as more than 50% of the fill material. The iron powder is at least 10% of the total electrode weight in the core of the E70T-1 electrode constructed in accordance with the present invention. Normally such electrodes have 15-19% of the electrode as fill material. By incorporating substantially more iron powder in the core material, the percentage of fill is increased to greater than 20% of the total electrode weight. Preferably, the fill material is greater than 22% of the total electrode weight and is in the range of 20-30%. In the preferred embodiment, fill material is in the range of 22-30% of the electrode weight. This adjustment of the percentage of fill material in the electrode is accomplished by the addition of iron powder into the core material. In this manner, the deposition rate can be increased with lower welding current. By adding substantially higher amounts of iron powder in the fill material, the sheath is relatively thin and requires lower current for melting. In summary, the modified E70T-1 electrode of the present invention has a substantially increased fill percentage over normal E70T-1 electrodes.

To create a titanium-boron alloying system in the resulting weld bead, the preferred embodiment of the present invention includes boron oxide. This produces a higher Charpy V-notch characteristic for the resulting weld bead. However, it has been found that boron oxide may have some detrimental effect on the overall cracking characteristics of the weld bead. For that reason, the percentage of boron oxide can be between 0-0.06% of the electrode. The adjustment is a compromise between the desired Charpy V-notch number and the desired cracking characteristics for the resulting weld bead. Boron oxide is the preferred component for introducing boron into the alloying system of the resulting weld bead; however, boron alloying may be accomplished by a retro alloy or elemental boron in some instances.

Calcium fluoride is included in the invention at a lower range than is normally used in E70T-1 type electrodes. It is used as a slag modifier to increased the porosity resistance caused by some organic substances on the weld metal or rust at the weld joint. At very low levels of calcium fluoride the fluoride scavenges hydrogen; however, at higher levels of calcium fluoride the arc becomes globular and causes spatter and increased fume generation. Consequently, in accordance with the invention, calcium fluoride is maintained at a relatively low amount. It is not employed as an oxygen scavenger. In the preferred embodiment, calcium fluoride is in the range of 0.05–0.30% by weight of the electrode and preferably in the range of 0.08–0.15% by weight of electrode. This is relatively low percentage of calcium fluoride for an E70T-1 type electrode and is used in combination with the polytetrafluoroethylene to reduce the hydrogen contamination of the resulting weld bead.

In accordance with the invention, the electrode includes 0.2-1.0% by weight of the electrode as polytetrafluoroethylene, normally referred to as Teflon. This Teflon is in small, particulate powder so it can be evenly distributed throughout the core of the electrode. Higher amounts of Teflon approaching 1.0% by weight of the electrode, can cause more spatter and is more expensive; however, the Teflon has a tendency to be consumed by a burning action during welding. The arc causes the polytetrafluoroethylene to disassociate and produce elemental fluorine, which has an affinity for hydrogen to produce hydrogen fluoride. Greater amounts of Teflon are not needed beyond an amount sufficient to produce the required fluorine. It is an important feature of the invention to use the polytetrafluoroethylene to control the amount of hydrogen in the weld metal. In accordance with another aspect of the invention, the Teflon is combined with the small amount of calcium fluoride for the purposes of further removing hydrogen from the weld metal. Amounts of Teflon below 0.2% by weight of the electrode release insufficient fluorine for cleaning hydrogen from the arc before it is absorbed by the weld metal.

As so far described, the invention involves an acid flux cored electrode of the type normally identified as a E70T-1 electrode. The core material of such electrodes often include an alloying system. In accordance with an aspect of the present invention, an alloying system constituting of one or more alloying agents such as aluminum, silicon, titanium, carbon and manganese are incorporated in a system in the range of 0–4.0% by weight of the electrode. The total carbon of the electrode is less than 0.05%. Preferably, aluminum is employed as granular elemental aluminum powder. This aluminum powder provides better arc stability and reduced fumes during the welding process. The aluminum powder reduces the titanium dioxide to deposit titanium in the weld metal. Titanium and boron produce a Ti-B alloying system of the weld metal. In some instances, retro titanium can be used to produce the desired deposit chemistry of the weld metal; however, in the present invention, aluminum is preferred for reducing the titanium dioxide to result in titanium for the weld metal. The aluminum powder is used in the amount of less than 1.0% by weight of the electrode. The alloying system can also include silicon in an amount less than 1% by weight of the electrode. The alloying system includes silicon as a primary deoxidizer and manganese as a secondary deoxidizer. It is possible to reduce the silicon to zero and increase the aluminum and/or reduce the aluminum and increase the silicon; however, aluminum can not be used above a controlled amount, such as 1.0% by weight of the electrode. The manganese can be obtained by manganese oxide reduced by silicon or another reducing agent to produce the manganese in the alloying system. Consequently, the aluminum, silicon and manganese alloying system can be modified to give the desired final alloying of the weld metal. Aluminum, silicon and manganese are deoxidizers and can be adjusted in accordance with the desired properties of the electrode.

The present invention relates to a gas shielded electrode producing low diffusible hydrogen in the range of less than 3.0 ml 100g of weld metal when using the AWSA4.3-86 mercury method. In this manner, the E70T-1 electrode can pass the GBOP test normally requiring a T5 type electrode. The Teflon reduces the hydrogen and the aluminum is employed for reducing the fumes. By increasing the percentage of fill above about 20% of the total electrode, a higher deposition rate can be obtained at high wire feeds normally employed at heavy equipment manufacturers. A thin jacket allows lower welding current for a given wire feed. As an example, a standard E70T-1 electrode having a normal fill percentage could produce about 21 lbs/hr of weld deposit at 500 amperes of welding current. By employing the present invention, with fill percentages above 22% of the total electrode weight, it has been found that 500 amperes of welding current can produce a weld deposit rate of 25-26 lbs/hr. This is a substantial improvement over existing electrodes.

Having defined the invention, preferred embodiments of the invention are claimed as follows:

1. A flux cored arc welding electrode of the type used with external shielding gas, said electrode comprising an outer ferrous sheath and a particulate fill material comprising an acidic flux system and alloying agents with the fill material having the following constituents:
   (a) an arc stabilizer;
   (b) titanium dioxide;
   (c) calcium fluoride;
   (d) an alloying system of 0-4.0 percent by weight of electrode selected from the class consisting of aluminum silicon, titanium, carbon and manganese;
   (e) iron to control the percentage of fill; and,
   (f) 0.2 to 1.0 percent by weight of electrode polytetrafluoroethylene powder.

2. An electrode as defined in claim 1 especially for downhand welding wherein said iron is in an amount causing said percentage of fill in said electrode to be greater than 20%.

3. En electrode as defined in claim 2 wherein said percentage fill is greater than 22%.

4. An electrode as defined in claim 2 wherein said percentage fill is in the range of 20-30%.

5. An electrode as defined in claim 2 wherein said percentage fill is in the range of 22-30%.

6. An electrode as defined in claim 2 with an amount less than 0.02% by weight of said electrode being boron.

7. An electrode as defined in claim 6 wherein said boron is in the form of boron oxide.

8. An electrode as defined in claim 2 wherein said arc stabilizer is in the amount of 0.2-0.5 percent by weight of said electrode.

9. An electrode as defined in claim 2 including aluminum oxide in the range of 0-0.6 percent by weight of said electrode.

10. An electrode as defined in claim 2 including silicon dioxide in the range of 1.0-1.5 percent by weight of said electrode.

11. An electrode as defined in claim 2 modified for out of position welding and including silicon dioxide less than 1.0 percent by weight of said electrode.

12. An electrode as defined in claim 2 wherein said titanium dioxide is in the range of 3.0-6.0 percent by weight of said electrode.

13. An electrode as defined in claim 2 wherein said calcium fluoride is in the range of 0.05 to 0.30 percent by weight of said electrode.

14. An electrode as defined in claim 2 wherein said calcium fluoride is in the range of 0.08 to 0.15 percent by weight of said electrode.

15. An electrode as defined in claim 2 wherein said arc stabilizer is selected from the class consisting of sodium oxide, potassium oxide or combinations thereof.

16. An electrode as defined in claim 2 especially for smaller diameter out-of-position welding wherein said iron is in an amount causing said percentage of fill in said electrode to be 12-18%.

17. An electrode as defined in claimed 1 with an amount less than 0.02% by weight of said electrode being boron.

18. An electrode as defined in claim 17 wherein said boron is in the form of boron oxide.

19. An electrode as defined in claim 18 wherein said boron oxide is in the range of 0 to 0.6 percent by weight of electrode.

20. An electrode as defined in claim 1 wherein said arc stabilizer is selected from the class consisting of sodium oxide, potassium oxide or combinations thereof.

21. An electrode as defined in claim 20 wherein said arc stabilizer is in the amount of 0.2-0.5 percent by weight of said electrode.

22. An electrode as defined in claim 1 wherein said arc stabilizer is in the amount of 0.2-0.5 percent by weight of said electrode.

23. An electrode as defined in claim 1 including aluminum oxide in the range of 0-0.6 percent by weight of said electrode.

24. An electrode as defined in claim 1 including silicon dioxide in the range of 1.0-1.5 percent by weight of said electrode.

25. An electrode as defined in claim 1 modified for out of position welding and including silicon dioxide less than 1.0 percent by weight of said electrode.

26. An electrode as defined in claim 1 wherein said titanium dioxide is in the range of 3.0-6.0 percent by weight of said electrode.

27. An electrode as defined in claim 1 wherein said titanium dioxide is in the range of 4.0-5.0 percent by weight of said electrode.

28. An electrode as defined in claim 1 wherein said calcium fluoride is in the range of 0.05 to 0,30 percent by weight of said electrode.

29. An electrode as defined in claim 1 wherein said calcium fluoride is in the range of 0.08 to 0.15 percent by weight of said electrode.

30. An electrode as defined in claim 1 wherein said iron in said fill material is at least 10 percent by weight of said electrode.

31. An electrode as defined in claim 1 wherein said alloy system includes manganese in the amount of at least 2.0 percent by weight of said electrode.

32. An electrode as defined in claim 1 wherein said alloy system includes aluminum in the amount of less than 1.0 percent by weight of said electrode.

33. An electrode as defined in claim 1 wherein said alloy system includes silicon in the amount of less than 1.0 percent by weight of said electrode.

34. An electrode as defined in claim 1 wherein there is no aluminum.

35. A flux cored arc welding electrode of the type used with external shielding gas, said electrode comprising an outer ferrous sheath and a particulate fill material comprising an acidic flux system and alloying agents with the fill material having the following constituents:
  (a) an arc stabilizer in the range of 0.2–0.5 percent by weight of said electrode;
  (b) titanium dioxide in the range of 3.0–6.0 percent by weight of said electrode;
  (c) calcium fluoride in the range of 0.08–0.15 percent by weight of said electrode;
  (d) an alloying system of 0–4.0 percent by weight of electrode selected from the class consisting of aluminum silicon, titanium, carbon and manganese;
  (e) iron to control the percentage of fill; and,
  (f) 0.2 to 1.0 percent by weight of electrode polytetrafluoroethylene powder.

36. An electrode as defined in claim 35 wherein said percentage fill is in the range of 22–30%.

37. An electrode as defined in claim 35 wherein said alloy system includes manganese in the amount of at least 2.0 percent by weight of said electrode.

38. An electrode as defined in claim 35 wherein said alloy system includes aluminum in the amount of less than 1.0 percent by weight of said electrode.

39. An electrode as defined in claim 35 wherein said alloy system includes silicon in the amount of less than 1.0 percent by weight of said electrode.

40. A flux cored arc welding electrode of the type used with external shielding gas, said electrode comprising an outer ferrous sheath and a particulate fill material comprising an acidic flux system with the fill material having the following constituents:
  (a) an arc stabilizer;
  (b) titanium dioxide;
  (c) aluminum in the amount of at least 1.10 percent by weight of said electrode; and,
  (d) 0.2 to 1.0 percent by weight of electrode polytetrafluoroethylene powder.

41. A flux cored arc welding electrode of the type used with external shielding gas, said electrode comprising an outer ferrous sheath and a particulate fill material comprising an acidic flux system and alloying agents with the fill material having the following constituents:
  (a) an arc stabilizer;
  (b) titanium dioxide;
  (c) an alloying system of 0–4.0 percent by weight of electrode selected from the group consisting of aluminum silicon, titanium, carbon and manganese;
  (d) iron to control the percentage of fill;
  (e) 0.2 to 1.0 percent by weight of electrode polytetrafluoroethylene powder; and
  (f) boron.

42. A flux cored arc welding electrode of the type used with external shielding gas, said electrode comprising an outer ferrous sheath and a particulate fill material comprising an acidic flux system and alloying agents with the fill material having the following constituents:
  (a) an arc stabilizer;
  (b) 3.0–12.0 percent by weight of electrode titanium dioxide;
  (c) an alloying system of 0–4.0 percent by weight of electrode selected from the class consisting of aluminum silicon, titanium, carbon and manganese;
  (d) iron to control the percentage of fill; and
  (e) 0.2 to 1.0 percent by weight of electrode polytetrafluoroethylene powder.

43. A flux cored arc welding electrode of the type used with external shielding gas, said electrode comprising an outer ferrous sheath and a particulate fill material comprising an acidic flux system and alloying agents with the fill material having the following constituents:
  (a) an arc stabilizer selected from the group consisting of sodium compounds and potassium compounds;
  (b) titanium dioxide:
  (c) an alloying system of 0–4.0 percent by weight of electrode selected from the class consisting of aluminum silicon, titanium, carbon and manganese;
  (d) iron to control the percentage of fill; and,
  (e) 0.2 to 1.0 percent by weight of electrode polytetrafluoroethylene powder.

* * * * *